(12) United States Patent
Kirillov

(10) Patent No.: US 11,686,819 B2
(45) Date of Patent: Jun. 27, 2023

(54) DYNAMIC BEAM SPLITTER FOR DIRECT TIME OF FLIGHT DISTANCE MEASUREMENTS

(71) Applicant: Infineon Technologies AG, Neubiberg (DE)

(72) Inventor: Boris Kirillov, Judendorf-Straßenge (AT)

(73) Assignee: Infineon Technologies AG, Neubiberg (DE)

( * ) Notice: Subject to any disclaimer, the term of this patent is extended or adjusted under 35 U.S.C. 154(b) by 907 days.

(21) Appl. No.: 16/590,692

(22) Filed: Oct. 2, 2019

(65) Prior Publication Data

US 2021/0103034 A1    Apr. 8, 2021

(51) Int. Cl.
*G01S 7/481*      (2006.01)
*G02B 27/14*      (2006.01)

(52) U.S. Cl.
CPC .......... *G01S 7/4812* (2013.01); *G01S 7/4817* (2013.01); *G02B 27/142* (2013.01)

(58) Field of Classification Search
CPC .... G01S 7/4812; G01S 7/4817; G02B 27/142
See application file for complete search history.

(56) References Cited

U.S. PATENT DOCUMENTS

2015/0293224 A1*  10/2015  Eldada ................... G01S 17/89
                                                          250/206.1
2019/0107622 A1*  4/2019  Andersson ............ G01S 7/4814

* cited by examiner

*Primary Examiner* — Girumsew Wendmagegn
(74) *Attorney, Agent, or Firm* — Harrity & Harrity, LLP

(57) ABSTRACT

A time-of-flight (ToF) optical beam splitter includes a main body having a first reflectivity and comprising a main surface configured to receive a receive light beam from an environment that corresponds to a transmit light beam transmitted into the environment, where the main surface includes a first region and a second region; and a reflective coating disposed on the main surface at the first region and excluded from the main surface at the second region, where the reflective coating has second reflectivity that is greater than the first reflectivity. The ToF optical beam splitter has a time variable splitting ratio with respect to the receive light beam that is dependent on a ToF of a round trip light beam comprising of the transmit light beam and the receive light beam.

32 Claims, 6 Drawing Sheets

DYNAMIC BEAM SPLITTER FOR DIRECT TIME OF FLIGHT DISTANCE MEASUREMENTS

FIELD

The present disclosure relates generally to a Light Detection and Ranging (LIDAR) transmitter and receiver, and, more particularly, to a coaxial LIDAR architecture.

BACKGROUND

Light Detection and Ranging (LIDAR), is a remote sensing method that uses light in the form of a pulsed laser to measure ranges (variable distances) to one or more objects in a field of view. In particular, a microelectromechanical system (MEMS) mirror is used to scan light across the field of view. Arrays of photodetectors receive reflections from objects illuminated by the light, and the time it takes for the reflections to arrive at various sensors in the photodetector array is determined. This is also referred to as measuring time-of-flight (TOF). LIDAR systems form depth measurements and make distance measurements by mapping the distance to objects based on the time-of-flight computations. Thus, the time-of-flight computations can create distance and depth maps, which may be used to generate images.

In some configurations, the MEMS mirror may be used to transmit light generated at the LIDAR transmitter into the field of view by directing the light as a certain transmission angle or direction. Light reflected from objects and received at the LIDAR receiver may also be received at the MEMS mirror and directed towards the photodetector array. This is referred to as a coaxial LIDAR architecture in which the MEMS mirror acts both as a transmission mirror and a receiver mirror. In such configurations, a beam splitter is used in order to direct transmitted light along a light transmission path and direct received light along a light receiver path. However, the beam splitter causes significant loses, which weakens the signal strength of received light making it more difficult to detect laser light. These losses may also limit the detection range of the LIDAR system itself.

Therefore, an improved that limits the losses in a coaxial LIADR architecture may be desirable.

SUMMARY

One or more embodiments provide a time-of-flight (ToF) optical beam splitter, including: a main body having a first reflectivity and including a first main surface configured to receive a transmit light beam and a second main surface, arranged opposite to the first main surface, configured to receive a receive light beam that corresponds to the transmit light beam, wherein the second main surface includes a first region and a second region; and a reflective coating disposed on the second main surface at the first region and excluded from the second main surface at the second region, wherein the reflective coating has second reflectivity that is greater than the first reflectivity. The ToF optical beam splitter has a time variable splitting ratio with respect to the receive light beam that is dependent on a ToF of a round trip light beam comprising of the transmit light beam and the receive light beam.

One or more embodiments provide a coaxial beam scanner, including: a transmitter configured to transmit a transmit light beam along a transmit beam path; a scanning structure configured to rotate about at least one scanning axis, the scanning structure configured to receive a portion of the transmit light beam from the transmitter, direct the portion of the transmit light beam into a field of view, receive, from the field of view, a receive light beam that corresponds to the portion of the transmit light beam, and direct the receive light beam along a receive beam path; a photodetector array configured to receive a portion of the receive light beam that is deflected by the scanning structure; and a time-of-flight (ToF) optical beam splitter arranged in the transmit beam path between the transmitter and the scanning structure and in the receive beam path between the scanning structure and the photodetector array.

The ToF optical beam splitter includes: a main body having a first reflectivity and including a main surface facing the scanning structure, wherein the main surface includes a first region and a second region; and a reflective coating disposed on the main surface at the first region and excluded from the main surface at the second region, wherein the reflective coating has second reflectivity that is greater than the first reflectivity. The ToF optical beam splitter has a time variable splitting ratio with respect to the receive light beam, the time variable splitting ratio being is dependent on a ToF of a round trip light beam comprising of the transmit light beam and the receive light beam.

One or more embodiments provide a coaxial Light Detection and Ranging (LIDAR) system, including: a transmitter configured to transmit a transmit light beam along a transmit beam path; a scanning structure configured to rotate about at least one scanning axis, the scanning structure configured to receive a portion of the transmit light beam from the transmitter, direct the portion of the transmit light beam into a field of view, receive, from the field of view, a receive light beam that corresponds to the portion of the transmit light beam, and direct the receive light beam along a receive beam path; a photodetector array configured to receive a portion of the receive light beam that is deflected by the scanning structure; and a time-of-flight (ToF) optical beam splitter arranged in the transmit beam path between the transmitter and the scanning structure and in the receive beam path between the scanning structure and the photodetector array, The ToF optical beam splitter includes: a main body having a first reflectivity and including a main surface facing the scanning structure, wherein the main surface includes a first region and a second region; and a reflective coating disposed on the main surface at the first region and excluded from the main surface at the second region, wherein the reflective coating has second reflectivity that is greater than the first reflectivity. The ToF optical beam splitter has a time variable splitting ratio with respect to the receive light beam that is dependent on a ToF of a round trip light beam comprising of the transmit light beam and the receive light beam.

One or more embodiments provide a coaxial beam scanner, including: a transmitter configured to transmit a transmit light beam along a transmit beam path; a scanning structure configured to rotate about at least one scanning axis, the scanning structure configured to receive the transmit light beam from the transmitter, direct the transmit light beam into a field of view, receive, from the field of view, a receive light beam that corresponds to the transmit light beam, and direct the receive light beam along one of two receive beam paths; a first photodetector array configured to receive the receive light beam that is deflected by the scanning structure along a first receive beam path of the two receive beam paths; a second photodetector array configured to receive the receive light beam that is deflected by the scanning structure along a second receive beam path of the two receive beam paths; and an optical beam splitter arranged in a coaxial beam path between the transmitter and the scanning structure and arranged between the scanning structure and the first and the second photodetector arrays.

The optical beam splitter is a total internal reflection prism includes: a first internal interface configured to receive the receive light beam from the scanning structure and deflect the receive light beam towards the first photo detector array along the first receive beam path, and a second internal interface configured to receive the receive light beam from the scanning structure and deflect the receive light beam towards the second photo detector array along the second receive beam path.

One or more embodiments provide a time-of-flight (ToF) optical beam splitter, including: a main body having a first reflectivity and including a main surface configured to receive a receive light beam from an environment that corresponds to a transmit light beam transmitted into the environment, wherein the main surface includes a first region and a second region; and a reflective coating disposed on the main surface at the first region and excluded from the main surface at the second region, wherein the reflective coating has second reflectivity that is greater than the first reflectivity, wherein the ToF optical beam splitter has a time variable splitting ratio with respect to the receive light beam that is dependent on a ToF of a round trip light beam comprising of the transmit light beam and the receive light beam.

BRIEF DESCRIPTION OF THE DRAWINGS

Embodiments are described herein making reference to the appended drawings.

DETAILED DESCRIPTION

Figure 1:
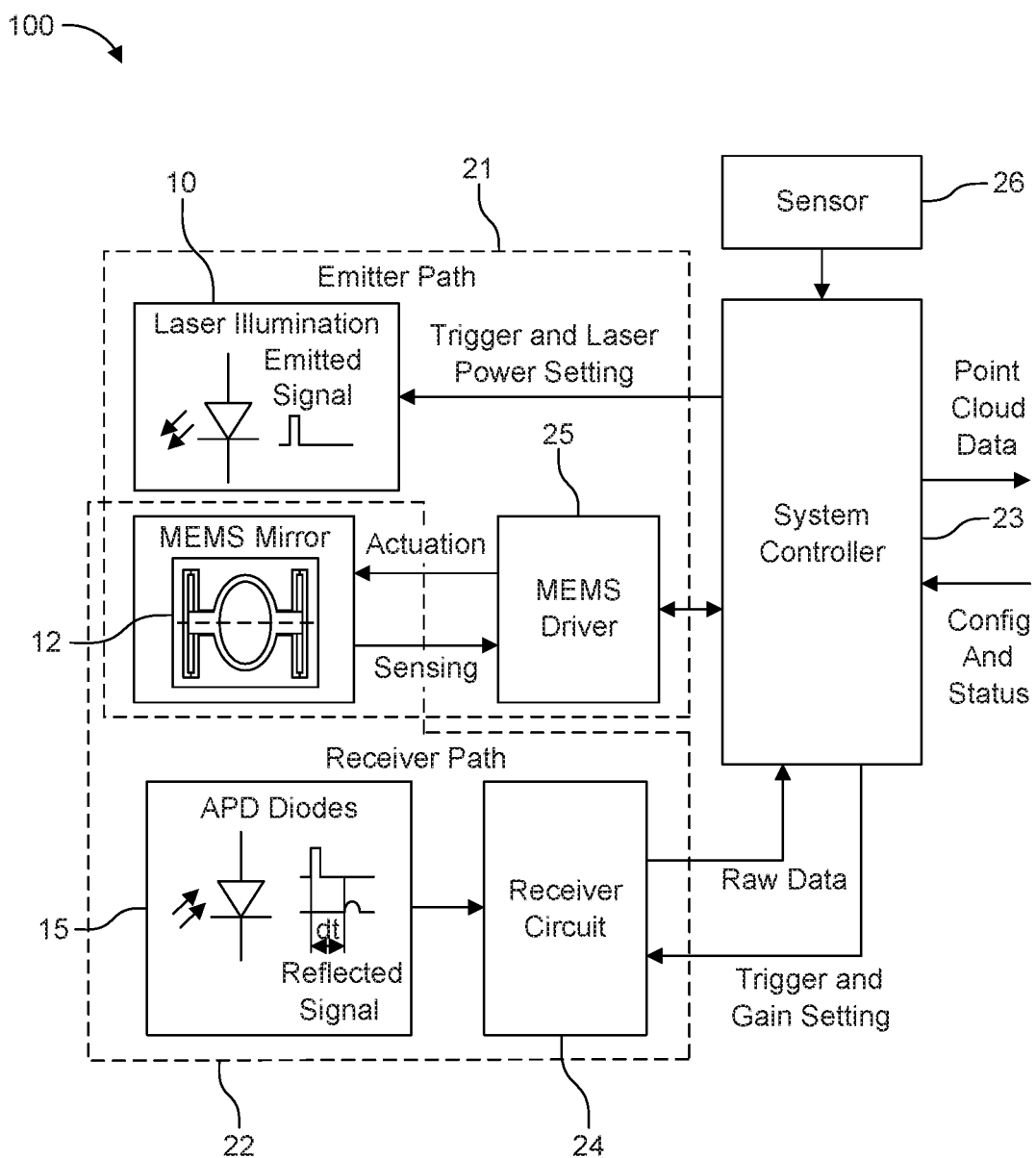
FIG. 1 is a schematic block diagram of the LIDAR scanning system 100 in accordance with one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming through a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In Light Detection and Ranging (LIDAR) systems, a light source transmits light pulses into a field of view and the light reflects from one or more objects by backscattering. In particular, LIDAR is a direct Time-of-Flight (ToF) system in which the light pulses (e.g., laser beams of infrared light) are emitted into the field of view, and a single pixel photodetector or a pixel array detects and measures the reflected light. For example, a single pixel photodetector or an array of photodetectors receives reflections from objects illuminated by the light.

Currently, a single pixel photodetector or a photodetector array may be used to measure the reflected light. The photodetector array may be a one-dimensional (1D) array that consists of multiple rows of photodetectors (pixels) arranged in a single column or a two-dimensional (2D) array that consists of multiple rows and columns of photodetectors arranged in a grid-like arrangement. Each pixel row or group of adjacent pixel rows may be readout as a measurement signal in the form of raw analog data. Each measurement signal may include data from a single pixel column or from two or more pixel columns corresponding to the selected pixel row or rows.

Differences in return times for each light pulse across multiple pixels of the pixel array can then be used to make digital 3D representations of an environment or to generate other sensor data. For example, the light source may emit a single light pulse, and a time-to-digital converter (TDC) electrically coupled to the pixel array may count from the time the light pulse is emitted, corresponding to a start signal, until a time the reflected light pulse is received at the receiver (i.e., at the pixel array), corresponding to a stop signal. The "time-of-flight" of the light pulse is then translated into a distance. In another example, an analog-to-digital converter (ADC) may be electrically coupled to the pixel array (e.g., indirectly coupled with intervening elements in-between) for pulse detection and ToF measurement. For example, an ADC may be used to estimate a time interval between start/stop signals with an appropriate algorithm.

A scan, such as an oscillating horizontal scan (e.g., from left to right and right to left of a field of view), can illuminate a scene in a continuous scan fashion. Each firing of the laser beam by the light sources can result in a scan line in the "field of view." By emitting successive light pulses in different scanning directions, an area referred to as the field of view can be scanned and objects within the area can be detected and imaged. Thus, the field of view represents a scanning plane having a center of projection. A raster scan could also be used.

FIG. 1 is a schematic block diagram of the LIDAR scanning system 100 in accordance with one or more embodiments. The LIDAR scanning system 100 includes a transmitter unit 21 that is responsible for an emitter path of the system 100, and a receiver unit 22 that is responsible for a receiver path of the system 100. The system also includes a system controller 23 that is configured to control components of the transmitter unit 21 and the receiver unit 22, and to receive raw data from the receiver unit 22 and perform processing thereon (e.g., via digital signal processing) for generating object data (e.g., point cloud data). Thus, the system controller 23 includes at least one processor and/or processor circuitry (e.g., comparators, TDCs, ADCs, and digital signal processors (DSPs)) of a signal processing chain for processing data, as well as control circuitry, such as a microcontroller, that is configured to generate control signals. The LIDAR scanning system 100 may also include a sensor 26, such as a temperature sensor, that provides sensor information to the system controller 23.

The transmitter unit 21 includes an illumination unit 10, a MEMS mirror 12, and a MEMS driver 25 configured to drive the MEMS mirror 12. In particular, the MEMS driver 25 actuates and senses the rotation position of the mirror, and provides position information (e.g., tilt angle or degree of rotation about the rotation axis) of the mirror to the system controller 23. Based on this position information, the laser sources of the illumination unit 10 are triggered by the system controller 23 and the photodiodes are activated to sense, and thus measure, a reflected light signal. Thus, a higher accuracy in position sensing of the MEMS mirror results in a more accurate and precise control of other components of the LIDAR system.

The MEMS mirror 12 is a mechanical moving mirror (i.e., a MEMS micro-mirror) integrated on a semiconductor chip (not shown). The MEMS mirror 12 according to this embodiment is configured to rotate about either a single scanning axis or two scanning axes that are typically orthogonal to each other. Alternatively, the MEMS mirror 12 may be a Lissajous scanner that is configured to control the steering of the laser beams. Thus, the MEMS mirror 12 is configured to oscillate continuously about one or more axes while the system scans a field of view. As such, light is reflected from the MEMS mirror 12 into the field of view in a plurality of directions.

Hence, a transmission technique includes transmitting the beams of light into the field of view from a transmission mirror that continuously oscillates about one or more scanning axes such that the beams of light are projected into the field of view that moves across the field of view as the transmission mirror changes the transmission direction. Upon impinging one or more objects, the transmitted light is reflected by backscattering back towards the LIDAR scanning system 100 as reflected light. As will be described in more detail below, the MEMS mirror 12 receives the reflected light and directs the reflected light onto a photodetector 15 via a beam splitter device. The photodetector 15 receives the reflected light and is configured to generate electrical measurement signals. The electrical measurement signals may be used by the systems controller 23 for generating a 3D map of the environment and/or other object data based on the reflected light (e.g., via TOF calculations and processing).

The receiver unit 22 includes the MEMS mirror 12, the photodetector 15, as well as a receiver circuit 24 that includes an analog readout circuit that is configured to read out measurement signals received from the photodetector 15.

The photodetector 15 can be any of a number of photodetector types; including avalanche photodiodes (APD), photocells, and/or other photodiode devices. Imaging sensors such as charge-coupled devices (CCDs) can be the photodetectors. In the examples provided herein, the photodetector 15 may be a single pixel photodetector (e.g., a single APD), a 1D APD array that comprises an array of APD pixels arranged in one dimension, or a two-dimensional (2D) APD array that comprises an array of APD pixels arranged in two dimensions. As noted above, the photodetector 15 may be a 1D array that includes a single column of photodiodes. The system controller 23 may synchronize the activation of the photodiodes with light pulses emitted by the illumination unit 10.

The photodetector 15 receives reflective light pulses as the receiving line RL and generates electrical signals in response thereto. Since the time of transmission of each light pulse from the illumination unit 10 is known, and because the light travels at a known speed, a time-of-flight computation using the electrical signals can determine the distance of objects from the photodetector 15. A depth map can plot the distance information.

The receiver circuit 24 may receive the analog electrical signals from the photodetectors of the photodetector 15 and transmit the electrical signals as raw analog data to the system controller 23 for processing. The receiver circuit 24 may also receive trigger control signals from the system controller 23 that triggers an activation of one or more photodetectors. The receiver circuit 24 may also receive gain setting control signals for controlling the gain of one or more photodetectors.

The system controller 23 uses the received data to calculate time-of-flight information for each field position within the field of view, to generate object data (e.g., point cloud data), and to generate a 3D point cloud.

Figure 2A:
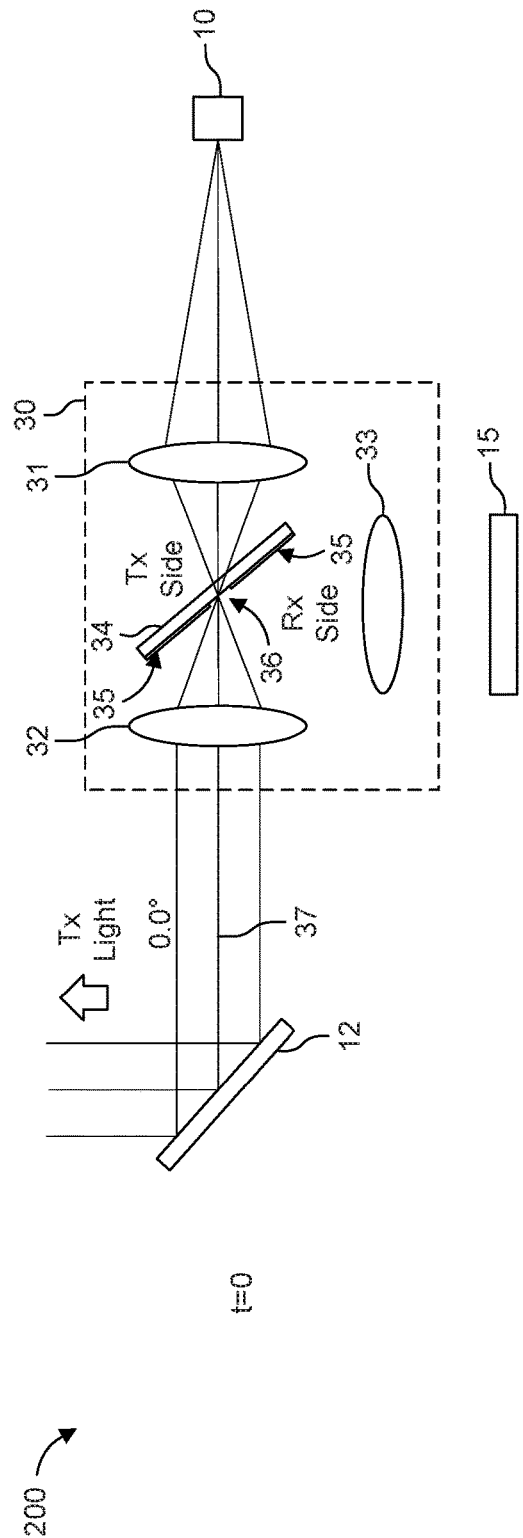
FIGS. 2A-2C are schematic diagrams of a coaxial LIDAR system according to one or more embodiments.
Figure 2B:
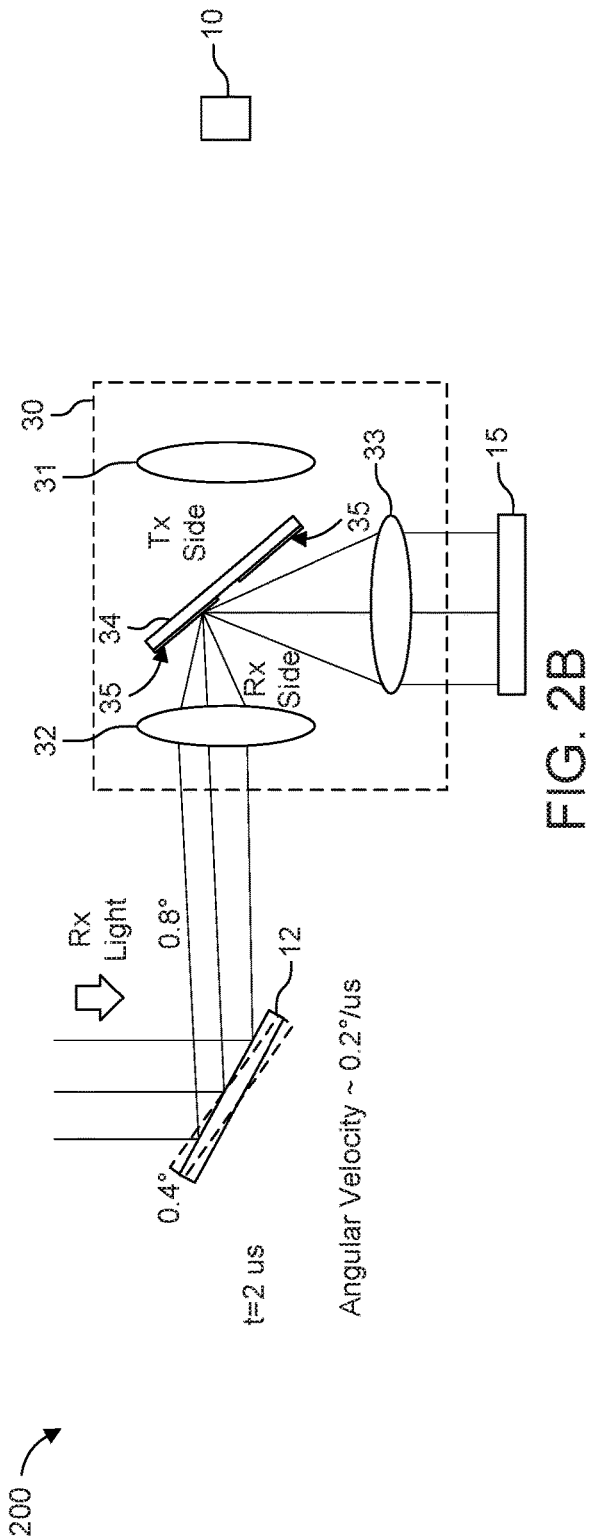
Figure 2C:
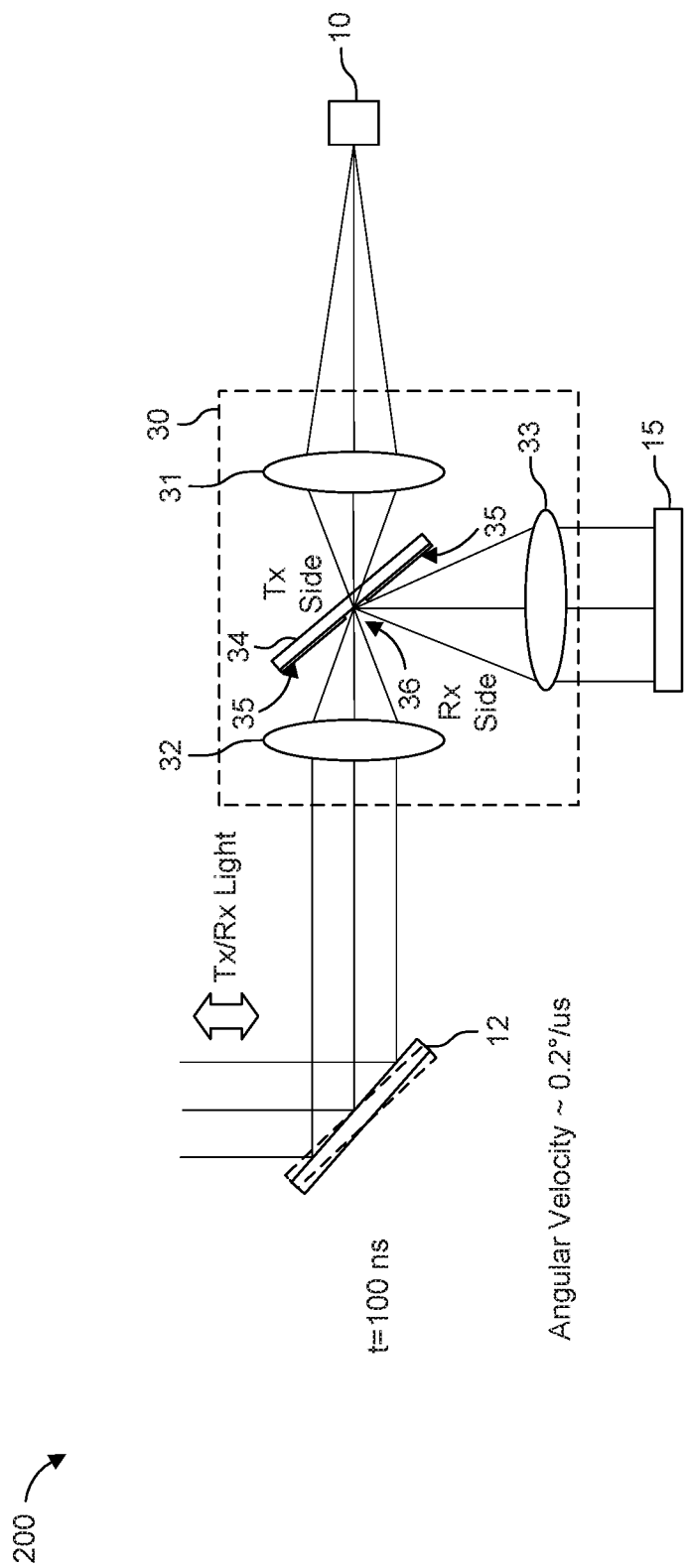

FIGS. 2A-2C are schematic diagrams of a coaxial LIDAR system 200 according to one or more embodiments, with FIG. 2B being directed to a "long" ToF situation and FIG. 2C being directed to a "short" ToF situation. The terms "long" and "short" are merely relative terms with respect to each other that result in different outcomes. Furthermore, FIG. 2A shows a scenario at a time moment of t=0 corresponding to a transmission time; FIG. 2B shows a scenario at a time moment of t=2 µs corresponding to a first reception time; and FIG. 2C shows a scenario at a time moment of t=100 ns corresponding to a second reception time.

As some non-exhaustive examples, the coaxial LIDAR system 200 may be implemented in mid-FOV, short-range applications using a 1D scanning mirror; mid-FOV, short-range, high-resolution applications using a 2D scanning mirror; narrow FOV, long range 1D scanning applications using a 1D scanning mirror; or narrow FOV, mid-range, high-resolution applications using a 2D scanning mirror.

The coaxial LIDAR system 200 is configured for both transmission and reception of laser beams using a single transmission/receiving mirror. Thus, the coaxial LIDAR system 200 includes the illumination unit 10, the oscillating (fast rotating) MEMS mirror 12 as the transmission/receiving mirror, and the photodetector 15 as described above. The MEMS mirror 12 is constantly rotating (oscillating) during a scanning operation and particularly during a time-of-flight of a light beam. The coaxial LIDAR system 200 further includes a beam management system 30, including a first beam collimator 31 (i.e., a first collimation lens), a second beam collimator 32 (i.e., a second collimation lens), a beam projector 33 (i.e., a projection lens), and an optical beam splitter 34.

The beam splitter 34 is an optical device that splits a beam of light (i.e., incident light) in two, which may or may not have the same optical power (i.e., signal strength). For example, incident light, whether it be transmission (TX) light received from the illumination unit 10 or received (RX) light from the environment, may be split into 50% transmitted light that is passed through at the same angle as the incident light and into 50% reflected light that is reflected at a different angle (e.g., typically at 45° which results in a 90° deflection from the transmitted beam). In this case, the main body or main substrate of the beam splitter 34 can be said to be 50% reflective, because 50% of the incident light is reflected and 50% of the incident light is transmitted. However, the reflectivity of the main body of the beam splitter 34 is configurable. For example, the main body of the beam splitter 34 may be 8% reflective, resulting in 8% of the incident light being reflected and 92% of the incident light being transmitted therethrough. Thus, it can be said that the main body of the beam splitter 34 has a reflectivity of X %, where X is any number greater than zero.

The beam splitter 34 may be a plate beam splitter, as shown, where its main body is a plate or substrate, which may be a dielectric mirror, thin-film polarizer, dichroic mirror, or the like. The main body may be a glass substrate or other material that provides the desired reflectivity of X %. Alternatively, the beam splitter 34 may be a beam splitter cube where the beam separation occurs at an interface within the cube.

The beam splitter 34 has a transmitter (TX) side having a first main surface 34a that is arranged to receive transmission light from the illumination unit 10 and the beam splitter 34 is configured pass a percentage of the transmission light to the MEMS mirror 12. The beam splitter 34 has a receiver (RX) side having a second main surface 34b that is arranged to receive light from the MEMS mirror (i.e., received from the environment) and direct a portion of the RX light towards the photodetector 15. Thus, the beam splitter 34 is arranged in a transmit beam path of a TX light beam and in a receive beam path of a RX light beam.

In addition, the beam splitter 34 includes a reflective coating 35 disposed onto the second main surface of the beam splitter 34 at the RX side. The reflective coating 35 may be a mirror coating or a mirror substrate that has 100% reflectivity. That is, it reflects 100% of the light incident thereon (i.e., 100% or an entire portion of the RX light beam). It will be appreciated that the reflective coating 35 may have a reflectivity of less than 100% in some configurations or in other embodiments described herein. For example, the reflective coating may have a reflectivity of 90%-100%, but is not limited thereto.

The beam splitter 34 further includes an aperture 36 that is defined by the reflective coating 35. That is, the aperture 36 is surrounded by the reflective coating 35 and exposes the second main surface of the beam splitter 34 at the RX side. As such, it can be said that the aperture 36 is located at the center region of the second main surface and the reflective coating is located at a peripheral region of the second main surface. The center region and the peripheral region share at least one boundary. The mutually shared boundary between the center region and the peripheral region may correspond to an angular-dependent or time-dependent threshold that defines a variable splitting ratio of the beam splitter 34.

The aperture 36 may be a circular hole, a rectangular slit or stripe, or some other opening. For example, in 1D-scanning mirror systems in which the MEMS mirror 12 rotates about a single scanning axis, a bar of laser light is produced. Thus, the aperture 36 may have an elongated rectangular slit or stripe shape in order to match the shape of the laser light. In contrast, in 2D-scanning mirror systems in which the MEMS mirror 12 rotates about two scanning axes, a dot of laser light is produced. Thus, the aperture 36 may have a circular hole shape in order to match the shape of the laser light.

As will be described in more detail below, the aperture 36 is arranged such that the TX light beams from the illumination unit 10 are transmitted therethrough towards the MEMS mirror 12.

Depending on the direction from which light is received, a collimator may focus a wide beam into a small spot or collimate a focused beam into a wider beam, for example, of parallel components.

The first beam collimator 31 is configured to receive TX light beams from the illumination unit 10 and focus the TX beam into a narrow beam. The aperture 36 may be arranged at a focal point of the first beam collimator 31 such that the width of the TX light is smaller than the aperture 36 and fits within the boundaries of the aperture 36. In other words, the aperture 36 is positioned such that the width of the TX light fits inside the aperture 36 and the transmittable portion of the TX light is passes entirely therethrough. The transmittable portion of the TX light is the portion of the TX light that is not reflected by the X % reflectivity of the main body of the beam splitter 34. Thus, Y % (i.e., Y %=100%−X %) of the TX light from the illumination unit 10 is passed through the main body and the aperture 36 of the beam splitter 34.

The aperture 36 may be arranged at a focal point of the second beam collimator 32. The second beam collimator 32 is configured to receive the transmittable portion of the TX light, convert the diverging beam into a wider beam of parallel rays by collimating the light received from the beam splitter 34, and pass the wider beam to the MEMS mirror 12. Here, it can be said that the TX light propagates from the second beam collimator 32 at 0° towards the MEMS mirror 12, where 0° defines the normal line 37.

At some point, the TX light transmitted from the LIDAR system 200 will be reflected by an objected and received by the LIDAR system 200 as RX light. During the transmission and the return of the light, the MEMS mirror 12 continues to rotate. For example, the MEMS mirror 12 may have an angular velocity of 0.2°/µs about a scanning axis. Thus, the angle of the MEMS mirror 12 will differ slightly from the angle of the MEMS mirror 12 at which the light was transmitted. Furthermore, the change in angular position depends on the ToF of the "round-trip" light beam, and thus, the distance of the object. The round trip light beam includes the transmit light beam and the receive light beam that corresponds to the (reflected) transmit light beam. For example, a ToF of 2 µs results in an angular position change (i.e., a delta angle) of 0.4°, which results in the RX beam being propagated by the MEMS mirror 12 at 0.8° from the normal line 37 towards the second beam collimator 32. Thus, the MEMS mirror 12 deflects the RX light towards a different area of the beam splitter 34 from which the light originated.

The second beam collimator 32 is configured to narrow the RX beam into a narrow beam that is incident on the RX side of the beam splitter 34. As a result of the shift in angular position of the MEMS mirror 12, the RX beam is shifted away from the center of the aperture 36 of beam splitter 34 and is incident on a different area of the beam splitter 34. In particular, for "long" time-of-flights, the RX beam will be incident on the reflective coating 35. The reflective coating 35, being 100% reflective, reflects 100% of the narrowed RX beam towards the beam projector 33, which further projects the RX beam onto the photodetector 15.

As a result of the reflective coating 36, the RX light does not experience any loss due to being deflected by the beam splitter 34. Overall, the light originally transmitted by the illumination unit 10 and received by the photodetector 15 only experiences loss within the LIDAR system 200 (i.e., by LIDAR system 200 components) from being transmitted through the beam splitter 34 from the TX side. For example, in the case where the reflectivity of the main body of the beam splitter is 8% (i.e., X %=8%), 92% of the TX light is transmitted through the aperture 36 of the beam splitter 34 and is transmitted out by the MEMS mirror 12. Upon receipt, since there is no loss from the reflective coating 36, 100% of the received light and 92% of the original light is received by the photodetector 15.

However, for "short" time-of-flights, the angular position of the MEMS mirror 12 (i.e., the delta angle) may not have shifted enough to move the RX beam to the reflective coating 35. That is, the delta angle of the MEMS mirror 12 is less than a threshold that would result in the RX beam to be incident on reflective coating 35. In this case, the RX beam will hit the aperture 36 and thus be incident on the main body of the beam splitter 34. As a result, the RX beam in this case will be subject to the reflective properties (i.e., the reflectivity X %) of the main body.

For example, FIG. 2C illustrates a situation where the ToF is "short." As an example, the ToF of the round trip light beam may be 100 ns resulting in a negligible shift in angular position of the MEMS mirror 12 and negligible shift of the RX beam from the normal line 37. As such, the RX beam passes through the aperture 36 on the RX side of the beam splitter 34 an is incident on the second main surface of the beam splitter 34. As a result, the main portion of the RX will not pass the beam splitter 34 and be directed towards the photodetector 15. However, a small portion of the RX will still be directed by the beam splitter 34 towards the photodetector 15 and can be detected. This may still result in improved dynamic range of the LIDAR system 200 at short distances.

Using again the above example of reflectivity, where the reflectivity of the main body of the beam splitter is 8% (i.e., X %=8%), 92% of the TX light is transmitted through the aperture 36 of the beam splitter 34 and is transmitted out by the MEMS mirror 12. Upon receipt, the RX light is incident on the second main surface of the beam splitter 34. Because the reflectivity of the main body of the beam splitter is 8%, only 8% of the RX light will be directed towards the photodetector 15. As a result, 7.36% (i.e., 92%×8%) of the original light, not factoring in loss from the environment, is received by the photodetector 15. However, because light beams with shorter time-of-flights are inherently stronger than those with longer time-of-flights due to less loss caused by the environment, this higher loss caused by the LIDAR system 200 is still acceptable because the RX beam itself for a shorter ToF is stronger. In addition, in other systems, the signal strength or optical power of the RX beam for close targets may be too strong for the photodetector 15 or may result in optical crosstalk between photodetectors of the photodetector 15 due to the high signal strength. Thus, reducing the signal strength or optical power of the RX beam for close targets (i.e., short ToF) acts as a time-dependent filter (i.e., a ToF-dependent filter) and provides an added benefit for the detection at the photodetector.

The aperture 36 and reflective coating 35 together serve as an angular filter, where a high percentage of light is transmitted to the photodetector 15 for angular shifts greater than a predetermined amount. In other words, a ToF of the round trip light beam that meets or exceeds a ToF threshold results in a certain angular shift in the MEMS mirror 12 that directs light at the reflective coating 35. The result is a main portion of the original light generated by the illumination unit 10 being received at the photodetector 15. On the other hand, when the ToF of the round trip light beam does not meets or exceeds a ToF threshold, the angular shift in the MEMS mirror 12 is not sufficient to shift the RX light outside of the aperture 36. The result is a small, minority portion of the original light generated by the illumination unit 10 being received at the photodetector 15.

Figure 3A:
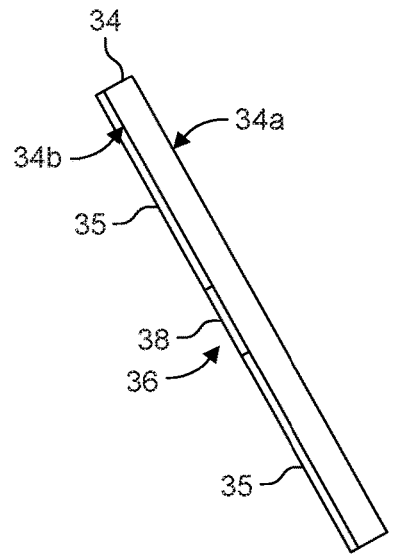
FIG. 3A is a cross-section of a beam splitter that includes another arrangement on its second main surface according to one or more embodiments.

FIG. 3A is a cross-section of a beam splitter 34 that includes another arrangement on its second main surface according to one or more embodiments. As shown, it is possible to coat the second main surface of the beam splitter 34 in the region of the aperture 36 with a partially transparent/reflective coating 38. The beam splitter 34 shown in FIG. 3A includes a partially transparent reflective coating 38 at the aperture 36 according to one or more embodiments. The partially transparent/reflective coating 38 has a higher reflectivity X % than the main body of the beam splitter 34 but lower than the reflective coating 35.

For example, the partially transparent/reflective coating 38 may have a reflectivity of 20%. Thus, the amount of light received at the photodetector 15 for "short" ToFs can be adjusted based on the material used for the partially transparent/reflective coating 38 (i.e., based on the reflectivity X % of the partially transparent/reflective coating 38). However, this would sacrifice some of the signal strength (i.e., optical power) for the TX light since the TX light must now pass through the partially transparent/reflective coating 38 in order to reach the MEMS mirror 12. Thus, one can balance the transmission and reception losses at aperture 36 based on design implementation.

Figure 3B:
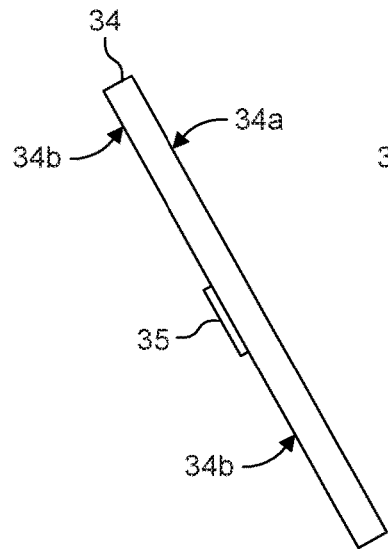
FIG. 3B is a cross-section of a beam splitter that includes another arrangement on its second main surface according to one or more embodiments.

FIG. 3B is a cross-section of a beam splitter 34 that includes another arrangement on its second main surface according to one or more embodiments. In this case, the reflective coating 35 is disposed on the second main surface in the center region of the beam splitter 34 corresponding to short ToF of the round trip light beam (i.e., small angle deviations of the MEMS mirror 12). Here, the reflective coating 35 takes the place of the aperture 36 and may have the same shape (e.g., either circular or stripe shaped) based on whether 1D or 2D scanning is used (i.e., based on the type of scanning mirror 12).

Figure 5A:
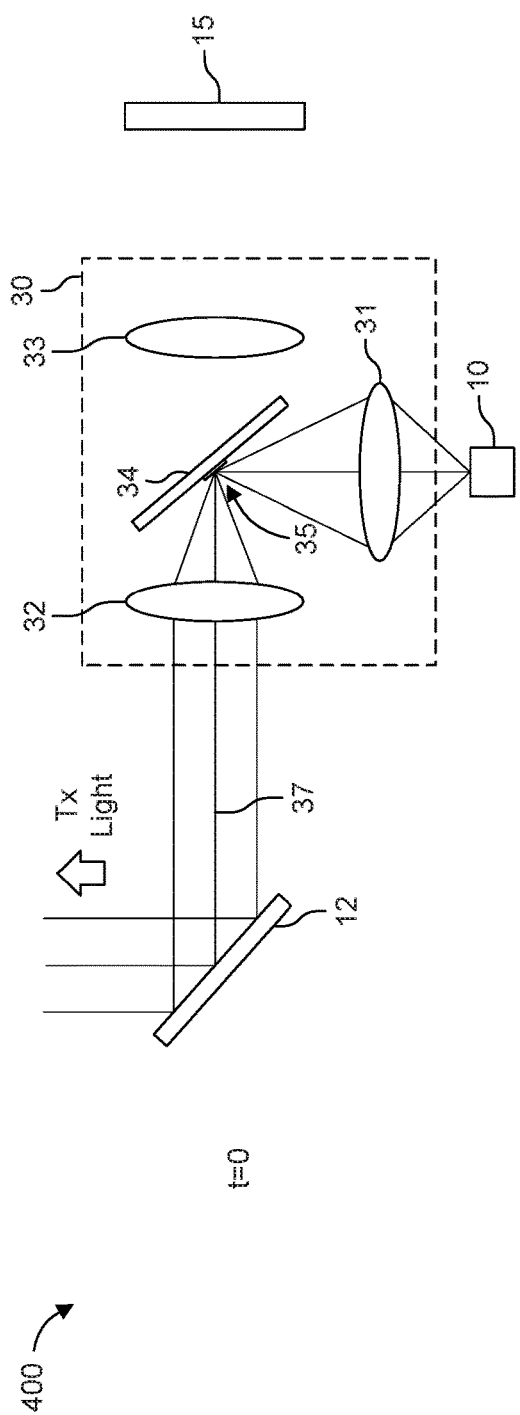
FIGS. 5A and 5B are schematic diagrams of a coaxial LIDAR system according to one or more embodiments that uses the beam splitter shown in FIG. 3B.
Figure 5B:
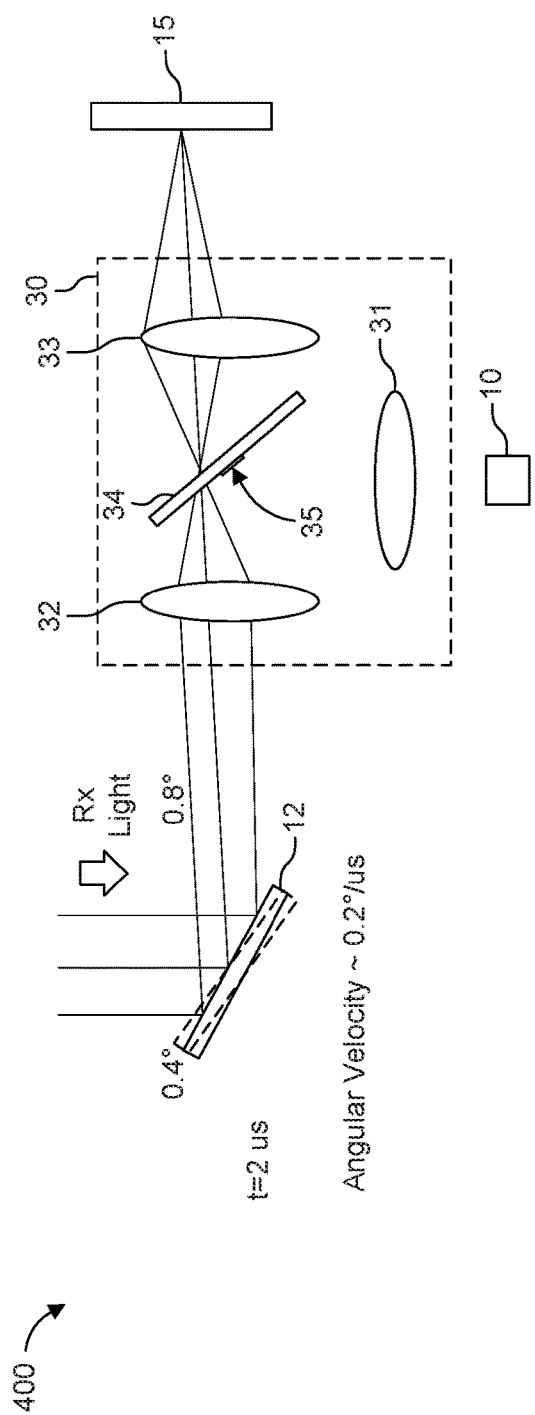

Thus, the second main surface is left exposed in regions outside the center region where the reflective coating 35 is provided. Those regions left exposed correspond to longer ToFs (i.e., larger angle deviations of the MEMS mirror 12) of the round trip light beam. Thus, the splitting ratio of the beam splitter 34 shown in FIG. 3B for a center region and a peripheral region is the inverse to the splitting ratio of the beam splitter 34 shown in FIGS. 2A-2C for the center region and the peripheral region FIGS. 5A and 5B are schematic diagrams of a coaxial LIDAR system 400 according to one or more embodiments that uses the beam splitter 34 shown in FIG. 3B. FIG. 5B being directed to a "long" ToF situation. Thus, FIG. 5A shows a scenario at a time moment of t=0 corresponding to a transmission time; and FIG. 5B shows a scenario at a time moment of t=2 μs corresponding to a reception time.

The coaxial LIDAR system 400 is configured for both transmission and reception of laser beams using a single transmission/receiving mirror. Thus, similar to coaxial LIDAR system 200, coaxial LIDAR system 400 includes the illumination unit 10, the oscillating (fast rotating) MEMS mirror 12 as the transmission/receiving mirror, and the photodetector 15 as described above. The MEMS mirror 12 is constantly rotating (oscillating) during a scanning operation and particularly during a time-of-flight of a light beam. The coaxial LIDAR system 400 further includes a beam management system 30, including a first beam collimator 31 (i.e., a first collimation lens), a second beam collimator 32 (i.e., a second collimation lens), a lens 33 which may be a beam projector (i.e., a projection lens) or a third collimation lens, and an optical beam splitter 34.

The coaxial LIDAR system 400 operates similar to the coaxial LIDAR system 200 except that the illumination unit 10 transmits laser beams at the reflective coating 35 of the beam splitter 34 for transmitting a beam. The reflective coating 35 reflects the TX beam towards the MEMS mirror 12 to transmission into the field-of-view.

At some point, the TX light transmitted from the LIDAR system 400 will be reflected by an object and received by the LIDAR system 400 as RX light. During the transmission and the return of the light, the MEMS mirror 12 continues to rotate. For example, the MEMS mirror 12 may have an angular velocity of 0.2°/μs about a scanning axis. Thus, the angle of the MEMS mirror 12 will differ slightly from the angle of the MEMS mirror 12 at which the light was transmitted. Furthermore, the change in angular position depends on the ToF of the "round-trip" light beam, and thus, the distance of the object. The round trip light beam includes the transmit light beam and the receive light beam that corresponds to the (reflected) transmit light beam.

For example, a ToF of 2 μs results in an angular position change of the MEMS mirror 12 of 0.4° (i.e., the delta angle), which results in the RX beam being propagated by the MEMS mirror 12 at 0.8° from the normal line 37 towards the second beam collimator 32. Thus, the MEMS mirror 12 deflects the RX light towards a different area of the beam splitter 34 from which the light originated. As shown in FIG. 5B, the RX light is incident on the beam splitter 35 in an area that does not include the reflective coating 35. Thus, a percentage of the RX light beam, dependent on the reflectivity of the main body of the beam splitter 34, passes through the main body of the beam splitter 34 towards the photodetector 15.

In this example, the reflective coating 35 may have a reflectivity of less than 100% such that short ToF situations can also be detected. In this case, a round-trip light beam has an RX beam that is deflected by the MEMS mirror 12 onto the reflective coating 35 of the beam splitter 34. Since the reflectivity of the reflective coating is less than 100% (e.g., 90-99%), a small percentage of RX light will be transmitted through the reflective coating 35, through the main body of the beam splitter 34, and reach the photodetector 15 where it can still be detected. This process is similar to the short time-of-flight situation described with FIG. 2C and has similar uses and benefits described in reference therewith.

Alternatively, the reflective coating 35 may have a reflectivity of 100%, in which case short time-of-flight situations cannot be detected (i.e., where the ToF is less than a threshold such that RX light is incident on the reflective coating 35).

Figure 3C:
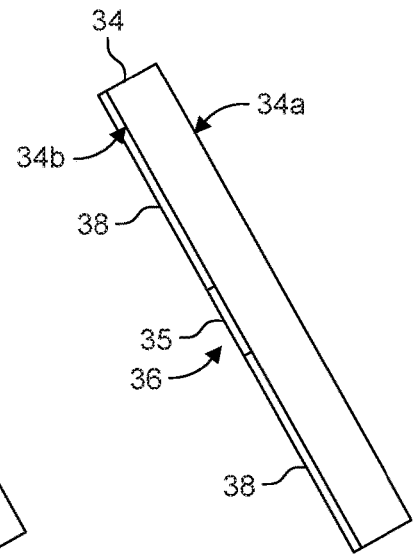
FIG. 3C is a cross-section of a beam splitter that includes another arrangement on its second main surface according to one or more embodiments.

FIG. 3C is a cross-section of a beam splitter 34 that includes another arrangement on its second main surface according to one or more embodiments. In particular, the beam splitter 34 shown in FIG. 3C has the reflective coating 35 and the partially transparent/reflective coating 38 disposed on its second main surface but in locations that are the inverse of the locations shown in FIG. 3A. Thus, the partially transparent/reflective coating 38 is disposed at the peripheral region of the second main surface, while the reflective coating 35 is deposed at the center region of the second main surface.

The coaxial LIDAR system 400 shown in FIGS. 5A and 5B may use the beam splitter 34 shown in FIG. 3C instead of the one shown in FIG. 3B.

Figure 3D:
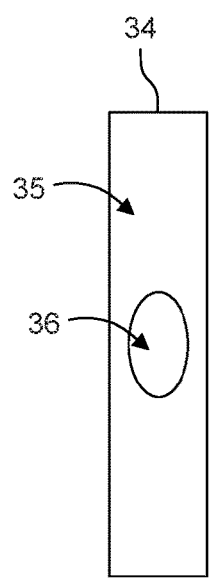
FIG. 3D is a front view of a beam splitter that includes an arrangement on its second main surface in view of FIGS. 2A-2C.

FIG. 3D is a front view of a beam splitter 34 that includes an arrangement on its second main surface in view of FIGS. 2A-2C. In particular, the aperture 36 has a circular shape adapted for 2D scanning. It will be appreciated that the shape of the aperture 36 may also be applied to those arrangements shown in FIGS. 3A-3C.

Figure 3E:
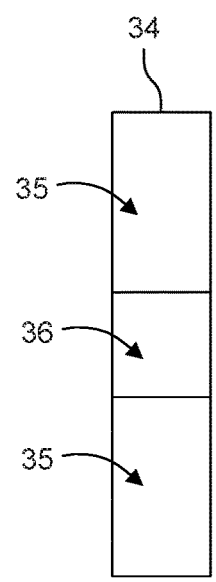
FIG. 3E is a front view of a beam splitter that includes another arrangement on its second main surface in view of FIGS. 2A-2C.

FIG. 3E is a front view of a beam splitter 34 that includes another arrangement on its second main surface in view of FIGS. 2A-2C. In particular, the aperture 36 has an elongated slit or stripe shape adapted for 1D scanning. It will be appreciated that the shape of the aperture 36 may also be applied to those arrangements shown in FIGS. 3A-3C.

Based on the above, the optical beam splitter 34 has a splitting ratio that is angle-dependent based on the angle of the MEMS mirror 12. Because the angle of the MEMS mirror 12 is time-dependent, based on the ToF of the round trip light beam, the splitting ratio of the beam splitter 34 is also time-dependent or ToF-dependent, where the time dependency also depends on the angular velocity of the MEMS mirror 12.

The angle dependency is represented by a difference (i.e., a delta angle) between a TX angle of the MEMS mirror 12 at the time the TX light is transmitted by the MEMS mirror 12 and an RX angle of the MEMS mirror 12 at the time the RX is received by the MEMS mirror 12. When the delta angle is small (i.e., the delta angle is less than a delta angle threshold), corresponding to a short ToF of the round trip light beam (i.e., the ToF of the TX/RX light is less than a ToF threshold)), the RX light is projected onto a center region of the beam splitter 34 that has a first splitting ratio. The center region may correspond to any of the arrangements shown in FIGS. 2A-2C and 3A-3E.

In contrast, when the delta angle is large (i.e., the delta angle is equal to or greater than the delta angle threshold), corresponding to a long ToF of the round trip light beam (i.e., the ToF of the TX/RX light is equal to or greater than the ToF threshold)), the RX light is projected onto a peripheral region of the beam splitter 34 that has a second splitting ratio that is different from the first splitting ratio. The peripheral region may correspond to any of the arrangements shown in FIGS. 2A-2C and 3A-3E. Thus, the ratio at which the light beam is separated by the beam splitter 34 and reflected towards the photodetector 15 is based on the delta angle or the ToF of the round trip light beam, both of which further depend on the angular velocity of the MEMS mirror 12.

The mutually shared boundary that defines the center region and the peripheral region of the second main surface corresponds to an angular-dependent or time-dependent threshold that defines a variable splitting ratio of the beam splitter 34.

When the delta angle is small (ToF is short) the major portion of RX beam follows the TX path towards the laser and therefore misses the detector. However, the small portion of RX beam is able to pass the beam splitter 34 (either via a non-100% reflecting mirror coating or due to non-perfect focusing on the reflecting part of it). The "pass-through" portion can be tuned by system alignment or by manufacturing mirror with the reflectivity, e.g. 99% in spite of 100%. In such a case 1% of RX light is able to reach photodetector even at a small delta angle. On the other hand, a small delta angle is associated with a short ToF and with a short measured distance respectively. A signal strength is inversely proportional to a distance squared and normally quite strong for a short ToF. To avoid saturation of photodetector it is beneficial to reduce the power of RX light coming from the short distance targets with the short ToF. The described above dynamic beam splitter can do this automatically because the major portion of short ToF signals is blocked by the beam splitter 34 and therefore has its strength significantly reduced.

Figure 4:
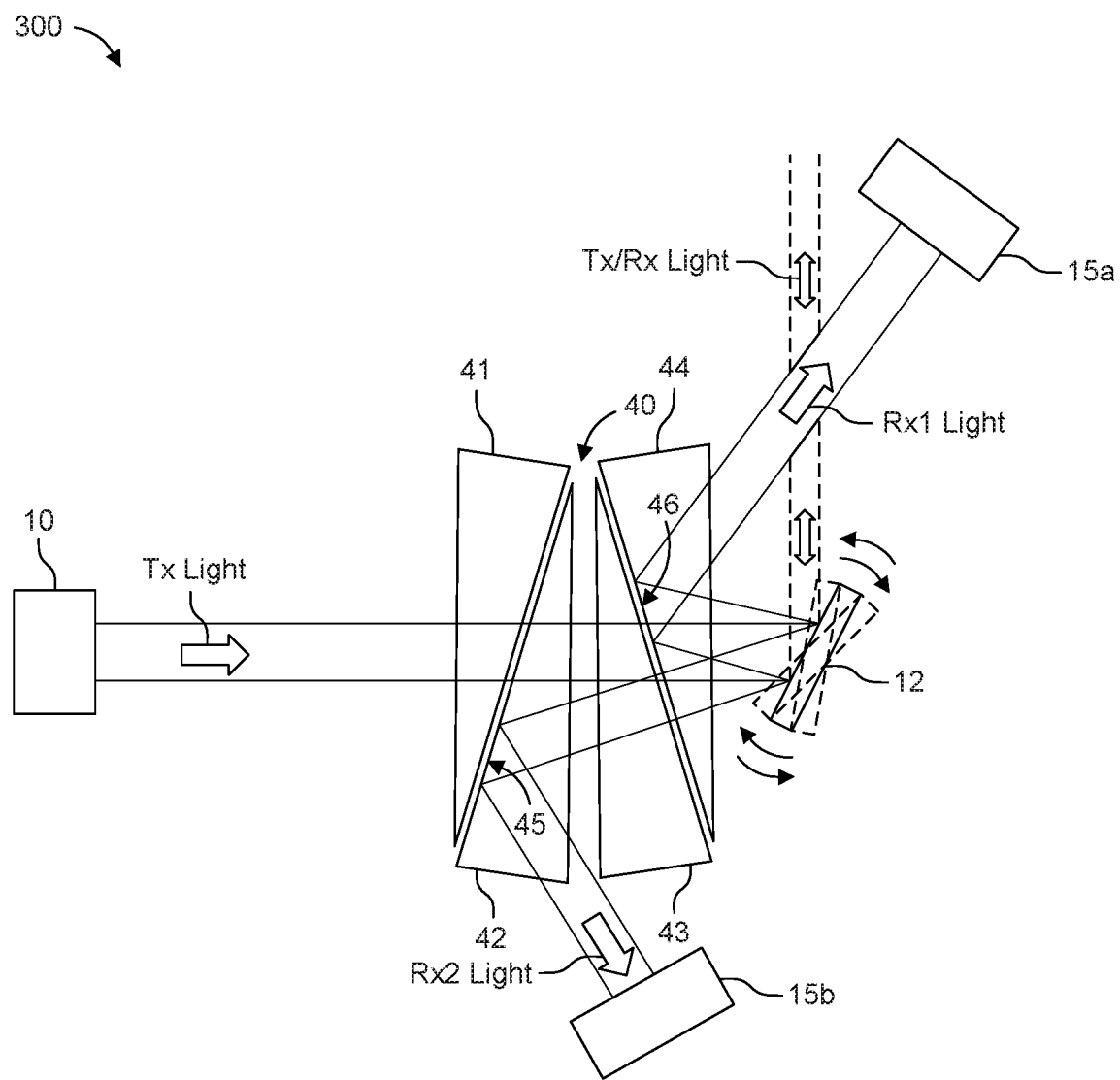
FIG. 4 schematic block diagram of a coaxial LIDAR system according to one or more embodiments.

FIG. 4 schematic block diagram of a coaxial LIDAR system 300 according to one or more embodiments. The coaxial LIDAR system 300 includes an illumination unit 10, a MEMS mirror 12, and two photodetectors 15a and 15b. In addition, the coaxial LIDAR system 300 includes a total internal reflection (TIR) prism 40. Total internal reflection means that light is fully reflected at the interface between two transparent media if the angle of incidence (i.e., the angular deviation from perpendicular incidence) is larger than the so-called critical angle. The TIR prism 40 include four prisms 41-44 such that total internal reflection can be exploited at two different locations 45 and 46 for received light (RX light), the different locations 45 and 46 each being located at a different internal interface formed by two of the prisms 41-44.

The illumination unit 10 is configured to transmit a laser beam (TX light) through the TIR prism 40 at the MEMS mirror 12. The TX light passes through the TIR prism 40 without any reflection and the MEMS mirror 12 transmits 100% of the TX light into the field of view. The RX light is eventually received and enters the system. In particular, the RX light is received by the MEMS mirror 12 and reflected towards the TIR prism 40. Thus, the TIP prism 40 arranged in a coaxial beam path between the illumination unit 10 and the MEMS mirror 12 and between the MEMS mirror 12 and the first and the second photodetectors 15a and 15b.

If the MEMS mirror 12 is tilted upward with a positive rotation angle (e.g., from 0° to 15°) at the time of receiving the RX light, the RX light is deflected by the MEMS mirror 12 towards TIR location 46 formed by prisms 43 and 44 as RX1 light. Upon being incident on TIR location 46 the RX1 light undergoes total internal reflection and is reflected towards photodetector 15a.

On the other hand, if the MEMS mirror 12 is tilted downward with a negative rotation angle (e.g., from less than 0° to)−15° at the time of receiving the RX light, the RX light is deflected by the MEMS mirror 12 towards TIR location 45 formed by prisms 41 and 42 as RX2 light. Upon being incident on TIR location 45 the RX2 light undergoes total internal reflection and is reflected towards photodetector 15b.

The following additional embodiments are provided:

1. A time-of-flight (ToF) optical beam splitter, comprising:
   a main body having a first reflectivity and comprising a first main surface configured to receive a transmit light beam and a second main surface, arranged opposite to the first main surface, configured to receive a receive light beam that corresponds to the transmit light beam, wherein the second main surface includes a first region and a second region; and
   a reflective coating disposed on the second main surface at the first region and excluded from the second main surface at the second region, wherein the reflective coating has second reflectivity that is greater than the first reflectivity,
   wherein the ToF optical beam splitter has a time variable splitting ratio with respect to the receive light beam that is dependent on a ToF of a round trip light beam comprising of the transmit light beam and the receive light beam.

2. The ToF optical beam splitter of embodiment 1, wherein the second reflectivity of the reflective coating is 100%.

3. The ToF optical beam splitter of embodiment 1, wherein:
   the second region is a center region of the second main surface through which a transmittable portion of the transmit light beam is transmitted therethrough, and
   the first region is a peripheral region of the second main surface that is peripheral to the center region.

4. The ToF optical beam splitter of embodiment 3, wherein the reflective coating forms an aperture at the second region of the second main surface, wherein the aperture exposes the second main surface.

5. The ToF optical beam splitter of embodiment 4, wherein the aperture has a circular shape or an elongated stripe shape.

6. The ToF optical beam splitter of embodiment 4, further comprising:
   a partially reflective coating disposed on the second main surface at the second region, wherein the partially reflective coating has a third reflectivity that is less than the second reflectivity and different from the first reflectivity.

7. The ToF optical beam splitter of embodiment 3, wherein the first region and the second region share at least one boundary, wherein the at least one boundary corresponds to a ToF threshold of the ToF.

8. The ToF optical beam splitter of embodiment 7, wherein:
   on a condition that the ToF of the round trip light beam is less than the ToF threshold, the ToF optical beam splitter is configured to receive the receive light beam at the second region, and
   on a condition that the ToF of the round trip light beam is equal to or greater than the ToF threshold, the ToF optical beam splitter is configured to receive the receive light beam at the first region.

9. The ToF optical beam splitter of embodiment 1, wherein:

the first region is a center region of the second main surface through which a transmittable portion of the transmit light beam is transmitted therethrough, and the second region is a peripheral region of the second main surface that is peripheral to the center region.

10. The ToF optical beam splitter of embodiment 9, further comprising:

a partially reflective coating disposed on the second main surface at the second region, wherein the partially reflective coating has a third reflectivity that is less than the second reflectivity and different from the first reflectivity.

11. A coaxial beam scanner, comprising:

a transmitter configured to transmit a transmit light beam along a transmit beam path;

a scanning structure configured to rotate about at least one scanning axis, the scanning structure configured to receive a portion of the transmit light beam from the transmitter, direct the portion of the transmit light beam into a field of view, receive, from the field of view, a receive light beam that corresponds to the portion of the transmit light beam, and direct the receive light beam along a receive beam path;

a photodetector array configured to receive a portion of the receive light beam that is deflected by the scanning structure; and a time-of-flight (ToF) optical beam splitter arranged in the transmit beam path between the transmitter and the scanning structure and in the receive beam path between the scanning structure and the photodetector array, wherein the ToF optical beam splitter comprises:

a main body having a first reflectivity and comprising a main surface facing the scanning structure, wherein the main surface includes a first region and a second region; and a reflective coating disposed on the main surface at the first region and excluded from the main surface at the second region, wherein the reflective coating has second reflectivity that is greater than the first reflectivity, wherein the ToF optical beam splitter has a time variable splitting ratio with respect to the receive light beam, the time variable splitting ratio being is dependent on a ToF of a round trip light beam comprising of the transmit light beam and the receive light beam.

12. The coaxial beam scanner of embodiment 11, wherein the ToF optical beam splitter is configured to receive the receive light beam from the scanning structure and deflect the portion of the receive light beam towards the photodetector array.

13. The coaxial beam scanner of embodiment 11, wherein the second region of the main surface is arranged in the transmit beam path such that the portion of the transmit light beam passes through the second region of the main surface to the scanning structure.

14. The coaxial beam scanner of embodiment 11, wherein the first region of the main surface is arranged in the transmit beam path such that the portion of the transmit light beam passes through the first region of the main surface to the scanning structure.

15. The coaxial beam scanner of embodiment 11, wherein the second reflectivity of the reflective coating is 100%.

16. The coaxial beam scanner of embodiment 11, wherein:

the second region is a center region of the main surface arranged in the transmit beam path and through which the portion of the transmit light beam is transmitted therethrough, and the first region is a peripheral region of the main surface that is peripheral to the center region.

17. The coaxial beam scanner of embodiment 16, wherein the reflective coating forms an aperture at the second region of the main surface, wherein the aperture exposes the main surface.

18. The coaxial beam scanner of embodiment 17, wherein the scanning structure is a one-dimensional microelectromechanical system (MEMS) oscillating structure configured to oscillate about a single scanning axis, and the aperture has an elongated stripe shape.

19. The coaxial beam scanner of embodiment 18, wherein the scanning structure is a two-dimensional microelectromechanical system (MEMS) oscillating structure configured to oscillate about two scanning axes, and the aperture has a circular shape.

20. The coaxial beam scanner of embodiment 17, further comprising:

a partially reflective coating disposed on the main surface at the second region, wherein the partially reflective coating has a third reflectivity that is less than the second reflectivity and different from the first reflectivity.

21. The coaxial beam scanner of embodiment 16, wherein the first region and the second region share at least one boundary, wherein the at least one boundary corresponds to a ToF threshold of the ToF of the round trip light beam.

22. The coaxial beam scanner of embodiment 21, wherein:

on a condition that the ToF of the round trip light beam is less than the ToF threshold, the ToF optical beam splitter is configured to receive the receive light beam at the second region and deflect the portion of the receive light beam towards the photodetector array, and on a condition that the ToF of the round trip light beam is equal to or greater than the ToF threshold, the ToF optical beam splitter is configured to receive the receive light beam at the first region and deflect the portion of the receive light beam towards the photodetector array.

23. The coaxial beam scanner of embodiment 22, wherein:

on a condition that the ToF of the round trip light beam is less than the ToF threshold, the deflected portion of the receive light beam corresponds to the first reflectivity, and on a condition that the ToF of the round trip light beam is equal to or greater than the ToF threshold, the deflected portion of the receive light beam corresponds to the second reflectivity.

24. The coaxial beam scanner of embodiment 11, wherein:

the scanning structure is configured to have a first rotation angle at a first time corresponding to receiving the portion of the transmit light beam and a second rotation angle at a second time corresponding to receiving the receive light beam, wherein a delta angle is a difference between the second rotation angle and the first rotation angle, the first region and the second region share at least one boundary, wherein the at least one boundary corresponds to a delta angle threshold, on a condition that the delta angle is less than the delta angle threshold, the ToF optical beam splitter is configured to receive the receive light beam at the second region and deflect the portion of the receive light beam towards the photodetector array, and on a condition that the delta angle is equal to or greater than the delta angle threshold, the ToF optical beam splitter is configured to receive the receive light beam at the first region and deflect the portion of the receive light beam towards the photodetector array.

25. The coaxial beam scanner of embodiment 11, wherein:

the first region is a center region of the main surface through which the portion of the transmit light beam is transmitted therethrough, and the second region is a peripheral region of the main surface that is peripheral to the center region.

26. The coaxial beam scanner of embodiment 25, further comprising:

a partially reflective coating disposed on the main surface at the second region, wherein the partially reflective coating has a third reflectivity that is less than the second reflectivity and different from the first reflectivity.

27. A coaxial Light Detection and Ranging (LIDAR) system, comprising:

a transmitter configured to transmit a transmit light beam along a transmit beam path;

a scanning structure configured to rotate about at least one scanning axis, the scanning structure configured to receive a portion of the transmit light beam from the transmitter, direct the portion of the transmit light beam into a field of view, receive, from the field of view, a receive light beam that corresponds to the portion of the transmit light beam, and direct the receive light beam along a receive beam path;

a photodetector array configured to receive a portion of the receive light beam that is deflected by the scanning structure; and a time-of-flight (ToF) optical beam splitter arranged in the transmit beam path between the transmitter and the scanning structure and in the receive beam path between the scanning structure and the photodetector array, wherein the ToF optical beam splitter comprises:

a main body having a first reflectivity and comprising a main surface facing the scanning structure, wherein the main surface includes a first region and a second region; and a reflective coating disposed on the main surface at the first region and excluded from the main surface at the second region, wherein the reflective coating has second reflectivity that is greater than the first reflectivity, wherein the ToF optical beam splitter has a time variable splitting ratio with respect to the receive light beam that is dependent on a ToF of a round trip light beam comprising of the transmit light beam and the receive light beam.

28. A coaxial beam scanner, comprising:

a transmitter configured to transmit a transmit light beam along a transmit beam path;

a scanning structure configured to rotate about at least one scanning axis, the scanning structure configured to receive the transmit light beam from the transmitter, direct the transmit light beam into a field of view, receive, from the field of view, a receive light beam that corresponds to the transmit light beam, and direct the receive light beam along one of two receive beam paths;

a first photodetector array configured to receive the receive light beam that is deflected by the scanning structure along a first receive beam path of the two receive beam paths;

a second photodetector array configured to receive the receive light beam that is deflected by the scanning structure along a second receive beam path of the two receive beam paths; and an optical beam splitter arranged in a coaxial beam path between the transmitter and the scanning structure and arranged between the scanning structure and the first and the second photodetector arrays, wherein the optical beam splitter is a total internal reflection prism comprising:

a first internal interface configured to, based on a time-of-flight of a round trip light beam comprising of the transmit light beam and the receive light beam, receive the receive light beam from the scanning structure and deflect the receive light beam towards the first photo detector array along the first receive beam path, and a second internal interface configured to, based on the time-of-flight of the round trip light beam, receive the receive light beam from the scanning structure and deflect the receive light beam towards the second photo detector array along the second receive beam path.

29. The coaxial beam scanner of embodiment 28, wherein:

the first internal interface is configured to receive the receive light beam from the scanning structure on a condition that the scanning structure has a positive tilt angle, and the second internal interface is configured to receive the receive light beam from the scanning structure on a condition that the scanning structure has a negative tilt angle.

30. The coaxial beam scanner of embodiment 28, wherein the first receive beam path corresponds to a positive tilt angle of the scanning structure and the second receive beam path corresponds to a negative tilt angle of the scanning structure.

31. The coaxial beam scanner of embodiment 28, wherein the total internal reflection prism comprises a first prism, a second prism, a third prism, and a fourth prism, and the first internal interface is an interface at the first prism and the second prism, and the second internal interface is an interface at the third prism and the fourth prism.

32. A time-of-flight (ToF) optical beam splitter, comprising:

a main body having a first reflectivity and comprising a main surface configured to receive a receive light beam from an environment that corresponds to a transmit light beam transmitted into the environment, wherein the main surface includes a first region and a second region; and a reflective coating disposed on the main surface at the first region and excluded from the main surface at the second region, wherein the reflective coating has second reflectivity that is greater than the first reflectivity, wherein the ToF optical beam splitter has a time variable splitting ratio with respect to the receive light beam that is dependent on a ToF of a round trip light beam comprising of the transmit light beam and the receive light beam.

33. The ToF optical beam splitter of embodiment 32, wherein the transmit light beam and the receive light beam are directed at the main surface for both transmission and reception of the round trip light beam.

34. The ToF optical beam splitter of embodiment 32, wherein the reflective coating is configured to receive and deflect the transmit light beam.

35. The ToF optical beam splitter of embodiment 32, wherein:

the second region is a center region of the second main surface through which a transmittable portion of the transmit light beam is transmitted therethrough, and the first region is a peripheral region of the second main surface that is peripheral to the center region.

36. The ToF optical beam splitter of embodiment 35, wherein the reflective coating forms an aperture at the second region of the main surface, wherein the aperture exposes the main surface.

37. The ToF optical beam splitter of embodiment 32, wherein:

the first region is a center region of the main surface, and the second region is a peripheral region of the main surface that is peripheral to the center region and through which a transmittable portion of the receive light beam is transmitted therethrough.

38. The ToF optical beam splitter of embodiment 32, further comprising:
a partially reflective coating disposed on the main surface at the second region, wherein the partially reflective coating has a third reflectivity that is less than the second reflectivity and different from the first reflectivity.

39. The ToF optical beam splitter of embodiment 32, wherein the first region and the second region share at least one boundary, wherein the at least one boundary corresponds to a ToF threshold of the ToF.

40. The ToF optical beam splitter of embodiment 39, wherein:
on a condition that the ToF of the round trip light beam is less than the ToF threshold, the ToF optical beam splitter is configured to receive the receive light beam at the second region, and
on a condition that the ToF of the round trip light beam is equal to or greater than the ToF threshold, the ToF optical beam splitter is configured to receive the receive light beam at the first region.

41. The ToF optical beam splitter of embodiment 40, wherein:
the second region is a center region of the second main surface through which a transmittable portion of the transmit light beam is transmitted therethrough, and
the first region is a peripheral region of the second main surface that is peripheral to the center region.

42. The ToF optical beam splitter of embodiment 39, wherein:
on a condition that the ToF of the round trip light beam is less than the ToF threshold, the ToF optical beam splitter is configured to receive the receive light beam at the first region, and
on a condition that the ToF of the round trip light beam is equal to or greater than the ToF threshold, the ToF optical beam splitter is configured to receive the receive light beam at the second region.

43. The ToF optical beam splitter of embodiment 42, wherein:
the first region is a center region of the main surface, and
the second region is a peripheral region of the main surface that is peripheral to the center region and through which a transmittable portion of the receive light beam is transmitted therethrough.

44. The ToF optical beam splitter of embodiment 32, wherein the second reflectivity of the reflective coating is 100%.

45. The ToF optical beam splitter of embodiment 32, wherein the second reflectivity of the reflective coating is less than 100%.

46. A time-of-flight (ToF) optical beam splitter, comprising:
an optical beam splitter arranged in a coaxial beam path, including a transmission beam path and a receiving beam path, wherein the optical beam splitter is a total internal reflection prism comprising:
a first internal interface configured to deflect a receive light beam, received along the receiving beam path, along a first deflected receive beam path on a condition that a round trip light beam comprising of a transmit light beam and the receive light beam has a ToF in a first range; and
a second internal interface configured to deflect the receive light beam, received along the receiving beam path, along a second deflected receive beam path on a condition that the round trip light beam has a ToF in a second range different from the first range.

47. The ToF optical beam splitter of embodiment 46, wherein the total internal reflection prism comprises a first prism, a second prism, a third prism, and a fourth prism, and the first internal interface is an interface at the first prism and the second prism, and the second internal interface is an interface at the third prism and the fourth prism.

Although embodiments described herein relate to a LIDAR system and LIDAR sensors, it is to be understood that the embodiments may be generally applied to optical beam splitters used in other applications in which optical scanning is used. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit. In some embodiments, some one or more of the method steps may be executed by such an apparatus.

Depending on certain implementation requirements, embodiments provided herein can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A time-of-flight (ToF) optical beam splitter, comprising:
a main body having a first reflectivity and comprising a main surface configured to receive a receive light beam from an environment that corresponds to a transmit light beam transmitted into the environment, wherein the main surface includes a first region and a second region,
wherein the first region and the second region share at least one boundary, wherein the at least one boundary corresponds to a ToF threshold of a ToF; and a reflective coating disposed on the main surface at the first region and excluded from the main surface at the second region, wherein the reflective coating has second reflectivity that is greater than the first reflectivity, wherein the ToF optical beam splitter has a time variable splitting ratio with respect to the receive light beam that is dependent on a ToF of a round trip light beam comprising of the transmit light beam and the receive light beam.

2. The ToF optical beam splitter of claim 1, wherein the transmit light beam and the receive light beam are directed at the main surface for both transmission and reception of the round trip light beam.

3. The ToF optical beam splitter of claim 1, wherein the reflective coating is configured to receive and deflect the transmit light beam.

4. The ToF optical beam splitter of claim 1, wherein:
the second region is a center region of the main surface through which a transmittable portion of the transmit light beam is transmitted therethrough, and
the first region is a peripheral region of the main surface that is peripheral to the center region.

5. The ToF optical beam splitter of claim 4, wherein the reflective coating forms an aperture at the second region of the main surface, wherein the aperture exposes the main surface.

6. The ToF optical beam splitter of claim 5, wherein the aperture has a circular shape or an elongated stripe shape.

7. The ToF optical beam splitter of claim 1, wherein:
the first region is a center region of the main surface, and
the second region is a peripheral region of the main surface that is peripheral to the center region and through which a transmittable portion of the receive light beam is transmitted therethrough.

8. The ToF optical beam splitter of claim 1, further comprising:
a partially reflective coating disposed on the main surface at the second region, wherein the partially reflective coating has a third reflectivity that is less than the second reflectivity and different from the first reflectivity.

9. The ToF optical beam splitter of claim 1, wherein:
on a condition that the ToF of the round trip light beam is less than the ToF threshold, the ToF optical beam splitter is configured to receive the receive light beam at the second region, and
on a condition that the ToF of the round trip light beam is equal to or greater than the ToF threshold, the ToF optical beam splitter is configured to receive the receive light beam at the first region.

10. The ToF optical beam splitter of claim 9, wherein:
the second region is a center region of the main surface through which a transmittable portion of the transmit light beam is transmitted therethrough, and
the first region is a peripheral region of the main surface that is peripheral to the center region.

11. The ToF optical beam splitter of claim 1, wherein:
on a condition that the ToF of the round trip light beam is less than the ToF threshold, the ToF optical beam splitter is configured to receive the receive light beam at the first region, and
on a condition that the ToF of the round trip light beam is equal to or greater than the ToF threshold, the ToF optical beam splitter is configured to receive the receive light beam at the second region.

12. The ToF optical beam splitter of claim 11, wherein:
the first region is a center region of the main surface, and
the second region is a peripheral region of the main surface that is peripheral to the center region and through which a transmittable portion of the receive light beam is transmitted therethrough.

13. The ToF optical beam splitter of claim 1, wherein the second reflectivity of the reflective coating is 100%.

14. The ToF optical beam splitter of claim 1, wherein the second reflectivity of the reflective coating is less than 100%.

15. A coaxial beam scanner, comprising:
a transmitter configured to transmit a transmit light beam along a transmit beam path;
a scanning structure configured to rotate about at least one scanning axis, the scanning structure configured to receive a portion of the transmit light beam from the transmitter, direct the portion of the transmit light beam into a field of view, receive, from the field of view, a receive light beam that corresponds to the portion of the transmit light beam, and direct the receive light beam along a receive beam path;
a photodetector array configured to receive a portion of the receive light beam that is deflected by the scanning structure; and
a time-of-flight (ToF) optical beam splitter arranged in the transmit beam path between the transmitter and the scanning structure and in the receive beam path between the scanning structure and the photodetector array,
wherein the ToF optical beam splitter comprises:
a main body having a first reflectivity and comprising a main surface facing the scanning structure, wherein the main surface includes a first region and a second region; and
a reflective coating disposed on the main surface at the first region and excluded from the main surface at the second region, wherein the reflective coating has second reflectivity that is greater than the first reflectivity,
wherein the ToF optical beam splitter has a time variable splitting ratio with respect to the receive light beam, the time variable splitting ratio being is dependent on a ToF of a round trip light beam comprising of the transmit light beam and the receive light beam, and
wherein the ToF optical beam splitter is configured to receive the receive light beam from the scanning structure and deflect the portion of the receive light beam towards the photodetector array.

16. The coaxial beam scanner of claim 15, wherein the second region of the main surface is arranged in the transmit beam path such that the portion of the transmit light beam passes through the second region of the main surface to the scanning structure.

17. The coaxial beam scanner of claim 15, wherein the first region of the main surface is arranged in the transmit beam path such that the portion of the transmit light beam passes through the first region of the main surface to the scanning structure.

18. The coaxial beam scanner of claim 15, wherein the second reflectivity of the reflective coating is 100%.

19. The coaxial beam scanner of claim 15, wherein:
the second region is a center region of the main surface arranged in the transmit beam path and through which the portion of the transmit light beam is transmitted therethrough, and the first region is a peripheral region of the main surface that is peripheral to the center region.

20. The coaxial beam scanner of claim 19, wherein the reflective coating forms an aperture at the second region of the main surface, wherein the aperture exposes the main surface.

21. The coaxial beam scanner of claim 20, wherein the scanning structure is a one-dimensional microelectromechanical system (MEMS) oscillating structure configured to oscillate about a single scanning axis, and the aperture has an elongated stripe shape.

22. The coaxial beam scanner of claim 21, wherein the scanning structure is a two-dimensional microelectromechanical system (MEMS) oscillating structure configured to oscillate about two scanning axes, and the aperture has a circular shape.

23. The coaxial beam scanner of claim 20, further comprising:
a partially reflective coating disposed on the main surface at the second region, wherein the partially reflective coating has a third reflectivity that is less than the second reflectivity and different from the first reflectivity.

24. The coaxial beam scanner of claim 19, wherein the first region and the second region share at least one boundary, wherein the at least one boundary corresponds to a ToF threshold of the ToF of the round trip light beam.

25. The coaxial beam scanner of claim 24, wherein:
on a condition that the ToF of the round trip light beam is less than the ToF threshold, the ToF optical beam splitter is configured to receive the receive light beam at the second region and deflect the portion of the receive light beam towards the photodetector array, and
on a condition that the ToF of the round trip light beam is equal to or greater than the ToF threshold, the ToF optical beam splitter is configured to receive the receive light beam at the first region and deflect the portion of the receive light beam towards the photodetector array.

26. The coaxial beam scanner of claim 25, wherein:
on a condition that the ToF of the round trip light beam is less than the ToF threshold, the deflected portion of the receive light beam corresponds to the first reflectivity, and
on a condition that the ToF of the round trip light beam is equal to or greater than the ToF threshold, the deflected portion of the receive light beam corresponds to the second reflectivity.

27. The coaxial beam scanner of claim 15, wherein:
the scanning structure is configured to have a first rotation angle at a first time corresponding to receiving the portion of the transmit light beam and a second rotation angle at a second time corresponding to receiving the receive light beam, wherein a delta angle is a difference between the second rotation angle and the first rotation angle,
the first region and the second region share at least one boundary, wherein the at least one boundary corresponds to a delta angle threshold,
on a condition that the delta angle is less than the delta angle threshold, the ToF optical beam splitter is configured to receive the receive light beam at the second region and deflect the portion of the receive light beam towards the photodetector array, and
on a condition that the delta angle is equal to or greater than the delta angle threshold, the ToF optical beam splitter is configured to receive the receive light beam at the first region and deflect the portion of the receive light beam towards the photodetector array.

28. The coaxial beam scanner of claim 15, wherein:
the first region is a center region of the main surface through which the portion of the transmit light beam is transmitted therethrough, and
the second region is a peripheral region of the main surface that is peripheral to the center region.

29. The coaxial beam scanner of claim 28, further comprising:
a partially reflective coating disposed on the main surface at the second region, wherein the partially reflective coating has a third reflectivity that is less than the second reflectivity and different from the first reflectivity.

30. A coaxial Light Detection and Ranging (LIDAR) system, comprising:
a transmitter configured to transmit a transmit light beam along a transmit beam path;
a scanning structure configured to rotate about at least one scanning axis, the scanning structure configured to receive a portion of the transmit light beam from the transmitter, direct the portion of the transmit light beam into a field of view, receive, from the field of view, a receive light beam that corresponds to the portion of the transmit light beam, and direct the receive light beam along a receive beam path;
a photodetector array configured to receive a portion of the receive light beam that is deflected by the scanning structure; and
a time-of-flight (ToF) optical beam splitter arranged in the transmit beam path between the transmitter and the scanning structure and in the receive beam path between the scanning structure and the photodetector array,
wherein the ToF optical beam splitter comprises:
a main body having a first reflectivity and comprising a main surface facing the scanning structure, wherein the main surface includes a first region and a second region,
wherein the first region and the second region share at least one boundary,
wherein the at least one boundary corresponds to a ToF threshold of a ToF; and
a reflective coating disposed on the main surface at the first region and excluded from the main surface at the second region, wherein the reflective coating has second reflectivity that is greater than the first reflectivity,
wherein the ToF optical beam splitter has a time variable splitting ratio with respect to the receive light beam that is dependent on a ToF of a round trip light beam comprising of the transmit light beam and the receive light beam.

31. The coaxial LIDAR system of claim 30, wherein the ToF optical beam splitter is configured to receive the receive light beam from the scanning structure and deflect the portion of the receive light beam towards the photodetector array.

32. The coaxial LIDAR system of claim 30, wherein the transmit light beam and the receive light beam are directed at the main surface for both transmission and reception of the round trip light beam.

* * * * *